United States Patent
Cam-Winget et al.

(10) Patent No.: US 7,966,489 B2
(45) Date of Patent: Jun. 21, 2011

(54) METHOD AND APPARATUS FOR SELECTING AN APPROPRIATE AUTHENTICATION METHOD ON A CLIENT

(75) Inventors: Nancy Cam-Winget, Mountain View, CA (US); Hao Zhou, Solon, OH (US); Robert B. O'Hara, Jr., Santa Clara, CA (US); Patrice R. Calhoun, Pleasanton, CA (US); Jeremy Stieglitz, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 11/496,903

(22) Filed: Aug. 1, 2006

(65) Prior Publication Data

US 2008/0034207 A1 Feb. 7, 2008

(51) Int. Cl.
*H04L 29/06* (2006.01)
*G06F 17/30* (2006.01)
(52) U.S. Cl. ........ 713/163; 713/156; 713/159; 713/170; 726/1; 726/2; 726/3; 726/5; 726/10; 726/14; 726/18; 709/19; 709/20; 709/225; 709/229
(58) Field of Classification Search .................. 713/163; 726/1–3, 5
See application file for complete search history.

(56) References Cited

U.S. PATENT DOCUMENTS

| | | | |
|---|---|---|---|
| 2003/0051041 A1* | 3/2003 | Kalavade et al. | 709/229 |
| 2004/0010713 A1* | 1/2004 | Vollbrecht et al. | 713/201 |
| 2004/0078597 A1* | 4/2004 | Sun et al. | 713/201 |
| 2004/0098588 A1* | 5/2004 | Ohba et al. | 713/169 |
| 2004/0111520 A1* | 6/2004 | Krantz et al. | 709/229 |
| 2005/0120213 A1* | 6/2005 | Winget et al. | 713/171 |
| 2005/0135625 A1* | 6/2005 | Tanizawa et al. | 380/270 |
| 2005/0138351 A1* | 6/2005 | Lee et al. | 713/151 |
| 2006/0026671 A1* | 2/2006 | Potter et al. | 726/7 |
| 2006/0039305 A1* | 2/2006 | Thawani et al. | 370/310 |
| 2006/0143693 A1* | 6/2006 | Glickman | 726/3 |
| 2006/0218393 A1* | 9/2006 | Hernandez et al. | 713/167 |
| 2006/0281437 A1* | 12/2006 | Cook | 455/404.2 |
| 2007/0118883 A1* | 5/2007 | Potter et al. | 726/4 |
| 2007/0213033 A1* | 9/2007 | Alper et al. | 455/411 |
| 2008/0043686 A1* | 2/2008 | Sperti et al. | 370/338 |
| 2008/0181187 A1* | 7/2008 | Scott et al. | 370/338 |
| 2009/0059874 A1* | 3/2009 | Carter | 370/338 |
| 2009/0262718 A1* | 10/2009 | Meier et al. | 370/338 |

OTHER PUBLICATIONS

Chen et al., Dec. 2005, EAP and IEEE 802.1x Tutorial and Empirical Experience, p. 526-532.*
Philip Kwan, May 2003, Ironshield White Paper, pp. 1-12.*
Microsoft Server 2003, Jun. 2004, PEAP, pp. 1-14.*
F. Andrangi et al, Jan. 2006, RFC 4284, pp. 1-14.*
Andy Dornan, Jan 1, 2004, Network Magazine, pp. 1-5.*
Zivkovi, Miroslav, et al., "Authentication Across Heterogeneous Networks", Bell Labs Technical Journal 10(2), 2005, pp. 39-56.
Riley, Steven, "Wireless security with 802.1x and PEAP", MCS Trustworthy Computing Services, Jan. 13, 2003.

* cited by examiner

*Primary Examiner* — Edan Orgad
*Assistant Examiner* — Jenise E Jackson
(74) *Attorney, Agent, or Firm* — Baker Botts L.L.P.

(57) ABSTRACT

In one embodiment, a method for facilitating authentication and ease the configuration of authentication includes receiving a credential type selection and selecting one or more authentication types based on the credential type selection and one or more policies set by the administrators. The policies can be preconfigured or dynamically pushed or fetched and updated to the client.

19 Claims, 8 Drawing Sheets

METHOD AND APPARATUS FOR SELECTING AN APPROPRIATE AUTHENTICATION METHOD ON A CLIENT

FIELD OF THE INVENTION

The present invention relates to both wireless and wire networks and, more particularly, to methods, apparatuses, and systems directed to authenticating clients in a network before allowing access.

BACKGROUND OF THE INVENTION

In local area network (LAN) configurations, a user is typically required to select a particular Extensible Authentication Protocol (EAP) method for authentication to gain network access. A problem with EAP selection is that users typically do not have much more knowledge about enterprise information technology (IT) requirements and, in particular, the appropriate EAP method. Accordingly, the required EAP method is typically made by a network administrator of an IT department, since a given EAP method is based on various complex technical considerations and requirements. Furthermore, there are an increasing number of EAP method types, and sometimes even multiple available methods suitable for the same type of user credentials. This makes it increasingly harder for a user to select the correct EAP method. Furthermore, there is a risk that if the user picks the wrong EAP type, not only would the network connection not be established, but there would also be an increased risk of user credentials being compromised (e.g., if a weak EAP type is being negotiated with a rogue device). Furthermore, by requiring EAP type configuration on the wireless client, migration to newer EAP types becomes a burden. Using state of the art products today, such a migration would require that users manually modify their network profiles.

DESCRIPTION OF EXEMPLARY EMBODIMENTS

A. Overview

Particular embodiments of the present invention facilitate authentication of clients in a network. According to one implementation, the present invention facilitates the configuration of one or more authentication attributes associated with client-side authentication functions. In one implementation, a user need only provide the wireless network infrastructure with the type of user credentials being used (e.g., user name, password, one time password, secure token, certificate, etc.), and a client utility automatically selects the appropriate authentication method based on the user credentials of the client, minimum security requirements based on the type of network (wired, wireless, dial-up etc.), and based on policies set by the network administrator. In one implementation, the authentication type may be an Extensible Authentication Protocol (EAP) method. As described in detail below, in one implementation, a network administrator may set policies mapping authentication types with sets of user credentials and may optionally set additional policies ranking authentication types by criteria (e.g., best security, best performance, etc.). The network client utility may include such policies in a policy configuration, which the network infrastructure transmits to the client during a configuration process. Accordingly, based on the user credentials that the user provides, a client utility/application may then select an authentication type based on those user credentials, minimum security requirements based on the type of network (wired, wireless, dial-up etc.), and the policy configuration. In one implementation, if more than one authentication type is available for a given set of user credentials, the client configuration application may select multiple authentication types and an order of preferences. In one implementation, the processes described above may be extended to wireless or wired networks, or any network the EAP is being used.

B. Exemplary Wireless Network System Architecture

B.1. Network Topology

Figure 1A:
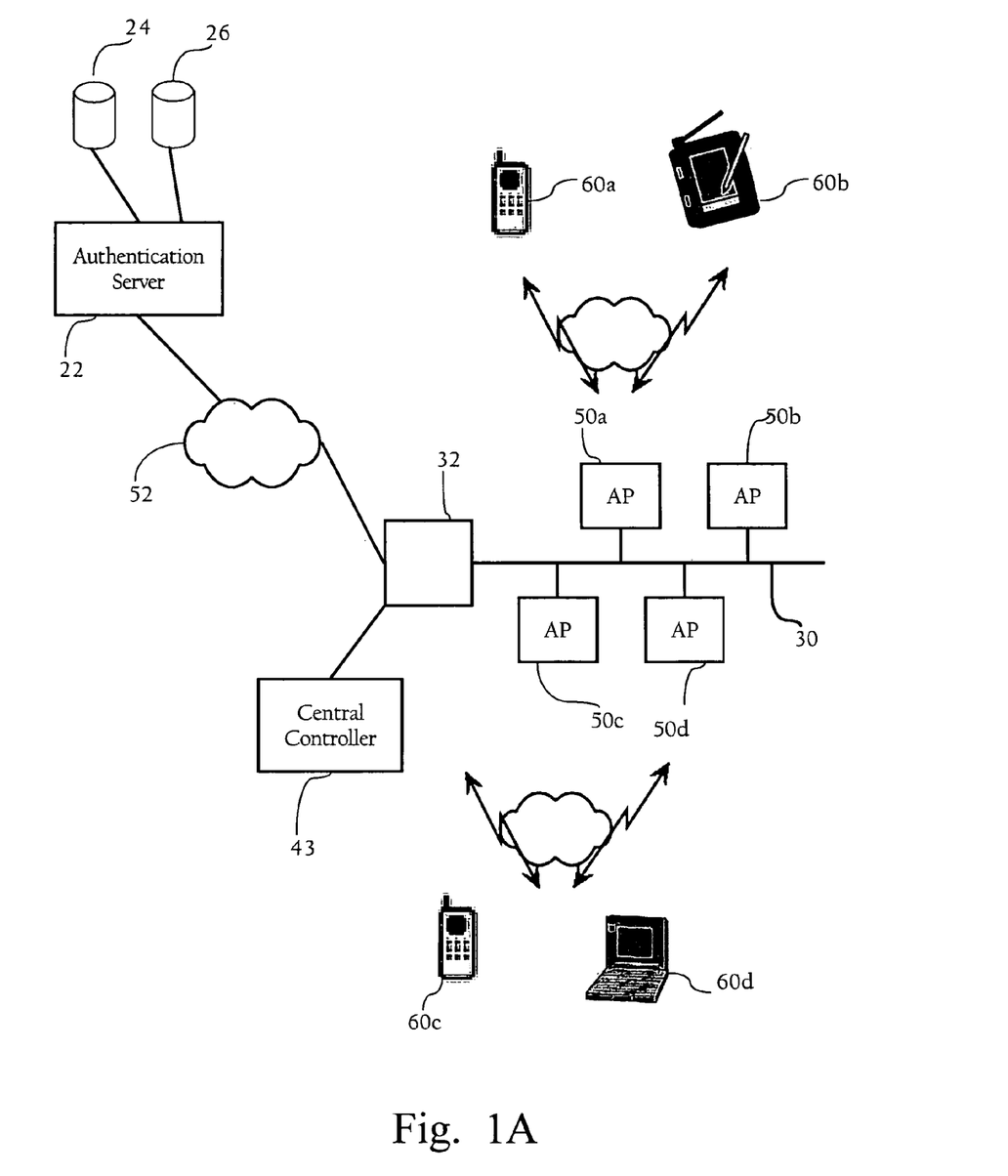
FIG. 1A is a topological diagram of the components in a wireless local area network (WLAN) system according to one implementation of the present invention.

A network environment including a wireless local area network (WLAN) according to one implementation of the present invention is shown in FIG. 1A. In a specific embodiment of the present invention, the system includes an authentication server 20, a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge.

As FIG. 1A illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between authentication server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1A illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (see FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. Of course, configuration and management information can be obtained in a variety of manners without departing from the scope of the present invention.

B.2. Central Controller

Figure 1B:
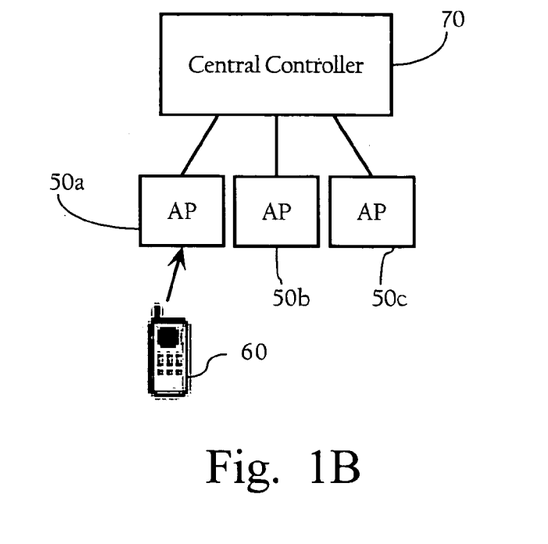
FIG. 1B illustrates a hierarchical wireless network including a central controller, according to one implementation of the present invention.

FIG. 1B illustrates a hierarchical wireless network including a central controller 70 according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented with a wireless switch, the central controller 70 is operative to communicate with light-weight wireless access points. As FIG. 1B illustrates, a central controller 70 may be directly connected to one or more access points 50. Alternatively, a central controller 43 may be operably connected to one or more access points over a switched and/or routed network environment, as FIG. 1A illustrates.

Figure 1C:
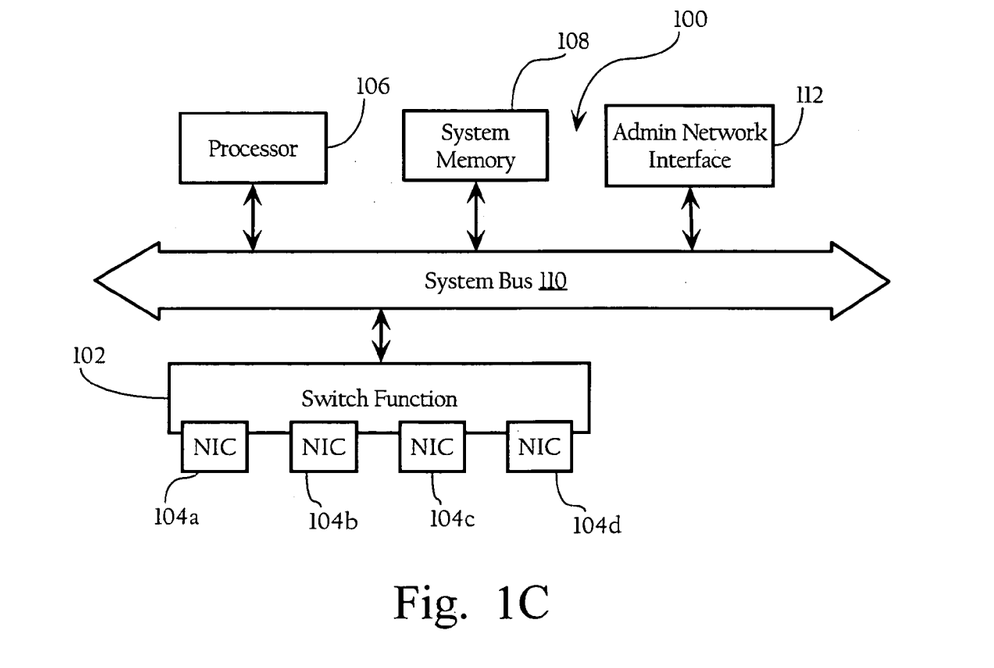
FIG. 1C illustrates for didactic purposes a hardware system, which may be used to implement a central controller.

FIG. 1C illustrates for didactic purposes a hardware system 100, which may be used to implement a central controller 70 of FIG. 1B. As FIG. 1C shows, in one implementation, the central control elements each comprise a switch function or fabric 102 comprising a network interface 104a (e.g., a Ethernet adapter) for connection to network 52 and network interfaces 104b, 104c, and 104d for connection to wireless access points. This switch function or fabric is implemented to facilitate connection to the access elements. Central controller 70, in one implementation, further comprises a processor 106, a memory 108, one or more software modules stored in memory 108, including instructions for performing the functions described herein, and a system bus 110 operably connecting these components. The central control elements may optionally include an administrative network interface 112 allowing for administrative access for such purposes as configuration and diagnostic access.

B.2. Authentication Server

Figure 2:
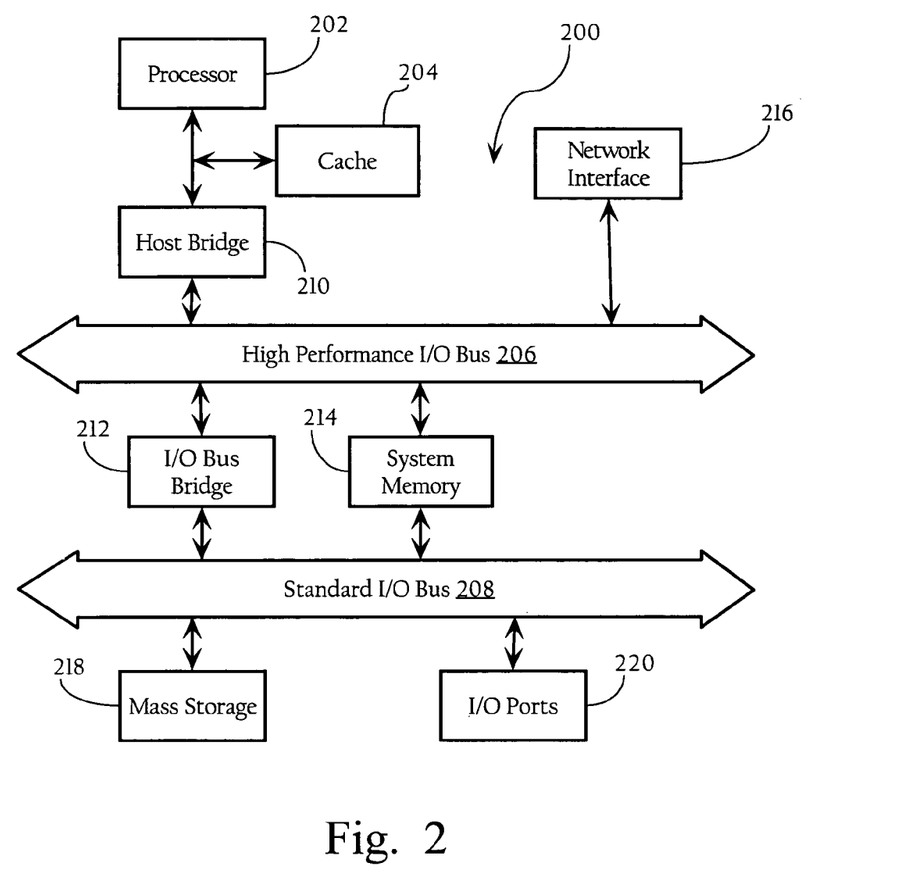
FIG. 2 illustrates for didactic purposes a hardware system, which may be used to implement an authentication server.
Figure 3:
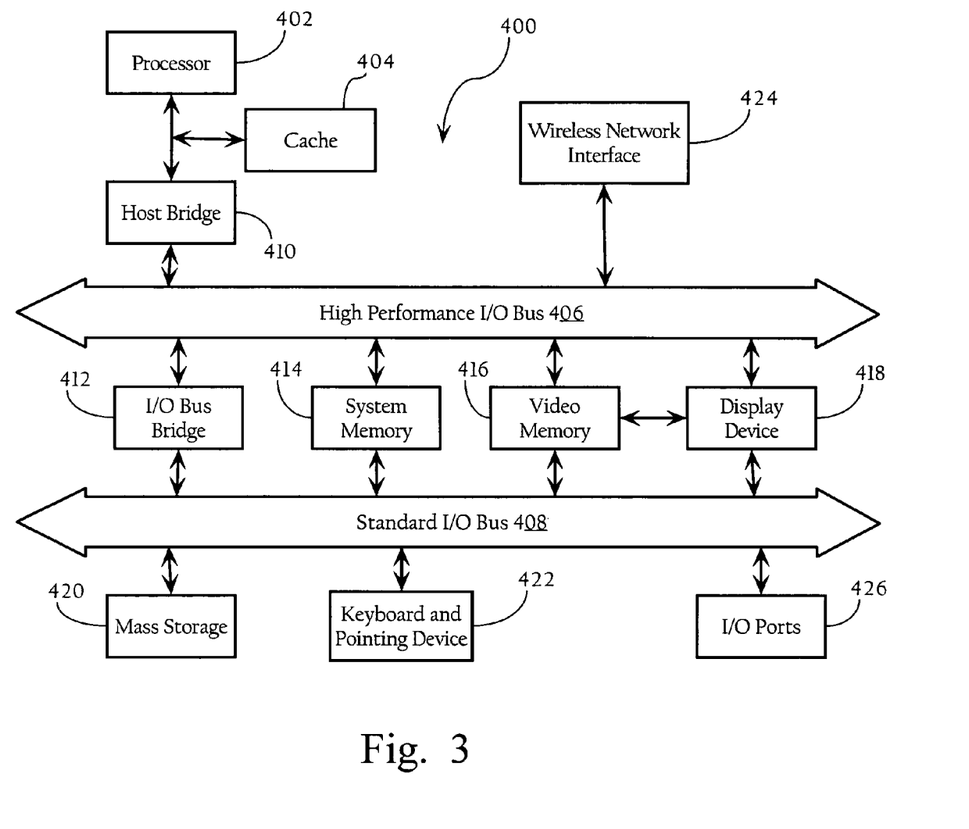
FIG. 3 illustrates for didactic purposes a hardware system, which may be used to implement a wireless client.

FIG. 2 illustrates for didactic purposes a hardware system 200, which may be used to implement authentication server 20 of FIG. 1A. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist with the components of hardware system 200 being coupled to the single bus. Furthermore, hardware system 200 may include additional components, such as additional processors, storage devices, or memories.

As discussed above, in one embodiment, the operations of the authentication server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.3. Wireless Client

Figure 4:
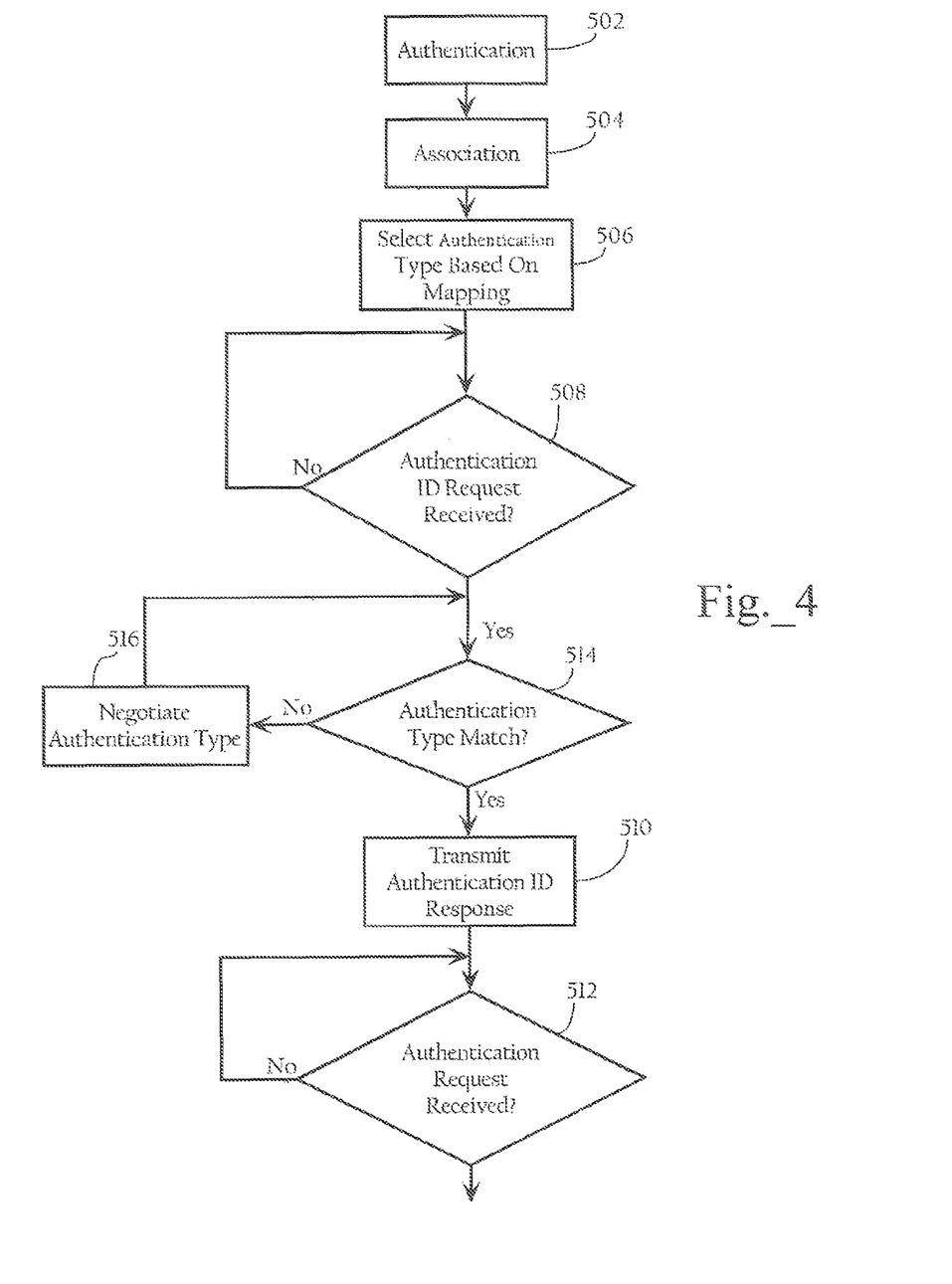
FIG. 4 is a flow chart illustrating a process flow, according to one implementation of the present invention, implemented at a wireless client.

FIG. 4 illustrates for didactic purposes a hardware system 400, which may be used to implement a wireless client 60 of FIG. 1A. In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 400 are described in greater detail below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require or not include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface client utility application and/or network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, one or more aspects of the client side functions discussed herein can be embodied in hardware or firmware.

While FIG. 4 illustrates, for didactic purposes, the hardware architecture of a wireless client according to one implementation of the present invention, the present invention, however, may be implemented on a wide variety of computer system architectures, such as special purpose, hand-held or portable devices, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, Symbian operating systems, and the like.

C. Authentication Method Selection and Negotiation

The following describes how a wireless client and a wireless network negotiate an authentication method type according to one implementation of the invention. FIG. 4 is a flow chart illustrating a process flow, according to one implementation of the present invention, implemented at a wireless client 60. As FIG. 4 shows, wireless client 60 initiates a media connection operation, which, in one implementation, may include authentication (502) and association (504) processes with the wireless network infrastructure. In one implementation, the authentication and association processes are open systems authentication processes according to the IEEE 802.11 WLAN specification. Next, wireless client 60 selects an authentication type based on a mapping (506) between a user-selected credential and one or more authentication methods. In one implementation, the authentication type may be an Extensible Authentication Protocol (EAP) type.

In one embodiment, the mapping provided by the wireless network infrastructure minimizes the knowledge needed by a user to authenticate by limiting the user choices to user credentials and optionally "levels" of security and performance (versus specific feature types). The reduction in choices reduces the dependence on the user to correctly configure the wireless client and provides more control to the network administrator. In one implementation, the mapping may be preconfigured on the wireless client (e.g., when a user gets a new wireless client or adds a new network interface to the wireless client). More specifically, for a given set of user credentials, the authentication type and order of preference may be preconfigured. As described in more detail below in connection with FIGS. 5A-5C, the authentication type may be based on several factors such as credential selection and applicable security policies. For example, a user-credential set including username and password could map to one authentication type (e.g., LEAP, PEAP, EAP-MD5, EAP-FAST, etc.) if the Network Admission Control (NAC) is not enabled. Or, the same user-credential set could also map to another authentication type (e.g., EAP-FAST, PEAP-MSCHAPv2, etc.) if the NAC is enabled.

Where performance versus security may be a tradeoff, the wireless network infrastructure may allow the user to provide performance and/or security choices in addition to providing user credentials. For example, performance choices may include "good," "better," "best," etc., and security choices may include "open," "legacy," "secure," etc. In one embodiment, the network administrator may disable such choices from the user if the policy requires the fastest performance, where one authentication type (e.g. LEAP) may be the most appropriate for a given set of user credentials. Similarly, in one embodiment, the policy may require the "most secure" authentication type (e.g. EAP-FAST) for a given set of user credentials.

Accordingly, based on the user credentials, type of network access, and local client policies, only certain authentication types may be allowed or disallowed. For example, on a wireless LAN, an authentication type, referred to as EAP-MD5, would not be allowed, because it does not generate keys and does not meet the wireless network EAP method requirements.

Next, wireless client 60 determines whether an authentication ID request, identifying an EAP type, has been received from authentication server 20 (508). Based on a user credential selection and security tradeoffs, the wireless client 60, as described above, automatically selects the appropriate authentication type suitable for the type of credentials and network access (506). In one implementation, if more than one authentication type is available, wireless client 60 may select one or more of the authentication types and optionally an order of preference. If the selected EAP type matches the EAP type in the authentication ID request, the wireless client transmits an authentication ID assertion response (510). If the EAP type identified in the authentication ID request does not match the selected (or most preferred) EAP type, Wireless client 60 then transmits a negative acknowledgment proposing the selected EAP type to authentication server 20. This EAP type negotiation continues until both ends agree on an EAP type (516). Authentication server 20 then initiates an authentication process according to the authentication type. Next, wireless client 60 determines if an EAP request has been received from authentication server 20 (512), and the wireless client and the authentication server 20 complete the authentication session.

D. Client Authentication Configuration Utility

Figure 5A:
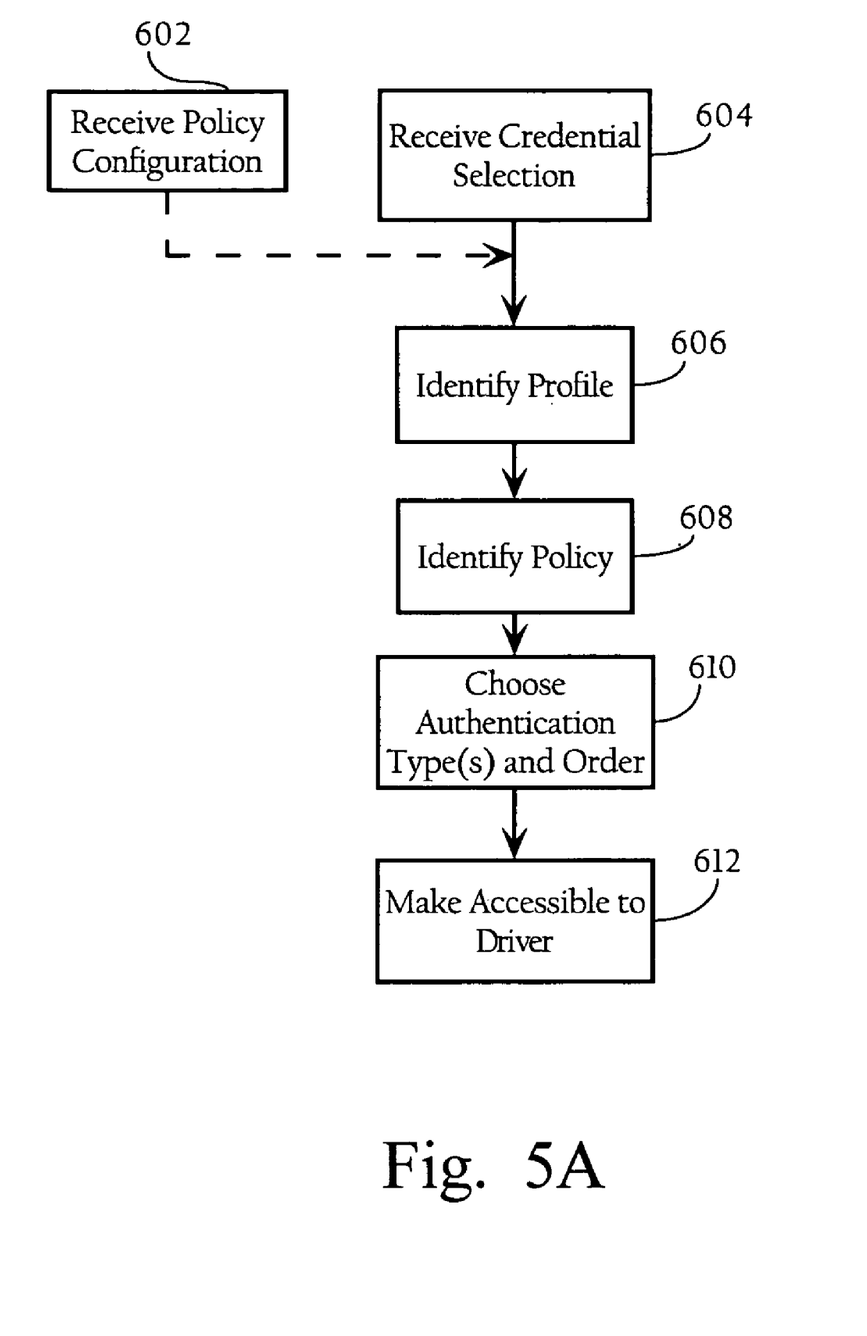
FIG. 5A is a flow chart illustrating a process flow, according to one implementation of the present invention, implemented by a client configuration application.

FIG. 5A is a flow chart illustrating a process flow, according to one implementation of the present invention, implemented by a client configuration application. As FIG. 5A shows, the client configuration application receives a policy configuration from the wireless network infrastructure (602). In one implementation, a network administrator determines the policy configuration, which is a policy or set of policies used to determine authentication types (e.g., EAP types) required for a given set of user credentials. In one implementation, the policy configuration includes security policies, which may include policies associated with Network Admission Control (NAC)/Network Admission Protocol (NAP) or Cisco Trusted Security (CTS) or any other security mechanisms. In one implementation, the policy configuration may be preloaded onto wireless client 60. In another implementation, the policy configuration may be stored and periodically updated in a configuration database accessible to the client configuration application. In one implementation, local client policies may be centrally managed by the administrator thru a standard policy management mechanisms, such as Group Policy Objects. Among the policy items, authentication types, which allow for a particular type of credentials, as well as an order of preferences, may be included. In one implementation, any suitable network management system or tool may be used to propagate policies or default profiles to wireless clients. This also allows the wireless network infrastructure to migrate to a newer authentication type over time with no wireless client-side configuration.

Next, the client configuration application receives a user credential selection from a user (604). As described above, the user credentials may include name and password, one time password, token, certificate, etc. In one implementation, additional selected information such as a trusted anchor for the authentication server or a means for the user to aid the application in choosing the trusted anchor may also be selected. In one implementation, a trusted anchor may be a data store containing information allowing for validation of credentials. In one implementation, a trusted anchor may be a certificate authority.

Note that the client configuration application may receive the policy configuration and credential selection in any order. For example, the client configuration application may receive the credential selection before receiving the policy configuration, as described above. Conversely, the client configuration application may receive the credential selection after receiving the policy configuration. In addition, as discussed above, the policy configuration may be preloaded on wireless client 60.

Next, the client configuration application identifies a profile (606), which may be based on the device type, network type (e.g., service set identifier (SSID)), network identity, etc. In one implementation, a profile is a set of parameters used to configure the hardware and software of the network adapter for operation on a particular network. The parameters may include, but are not limited to, radio band selections, data rate selections, proprietary extension selections, security method selections, user identity information, authentication method selections, and network identification information.

Next, the client configuration application identifies a policy (608), which may be based on the credential selection and the identified profile, etc. Next, the client configuration application may receive the credential selection before receiving the policy configuration, may select one or more authentication types, and optionally may select the order of preference of authentication types (610). In one implementation, the order of preference may be based on the policy configuration and identified profile. Accordingly, such implementations enable wireless clients to better support servers having different authentication types.

Next, the client configuration application makes the authentication type and order accessible to the network interface driver of the wireless client (612). In one implementation, the authentication type and order may be stored in a configuration file or in a database accessible to the network interface driver.

In one implementation, once the network interface driver has access to the authentication type, the network interface driver may then negotiate with the authentication server standard authentication/EAP method procedures, as discussed above, to determine an authentication type that both the wireless client and the authentication server will use for a connection.

Figure 5B:
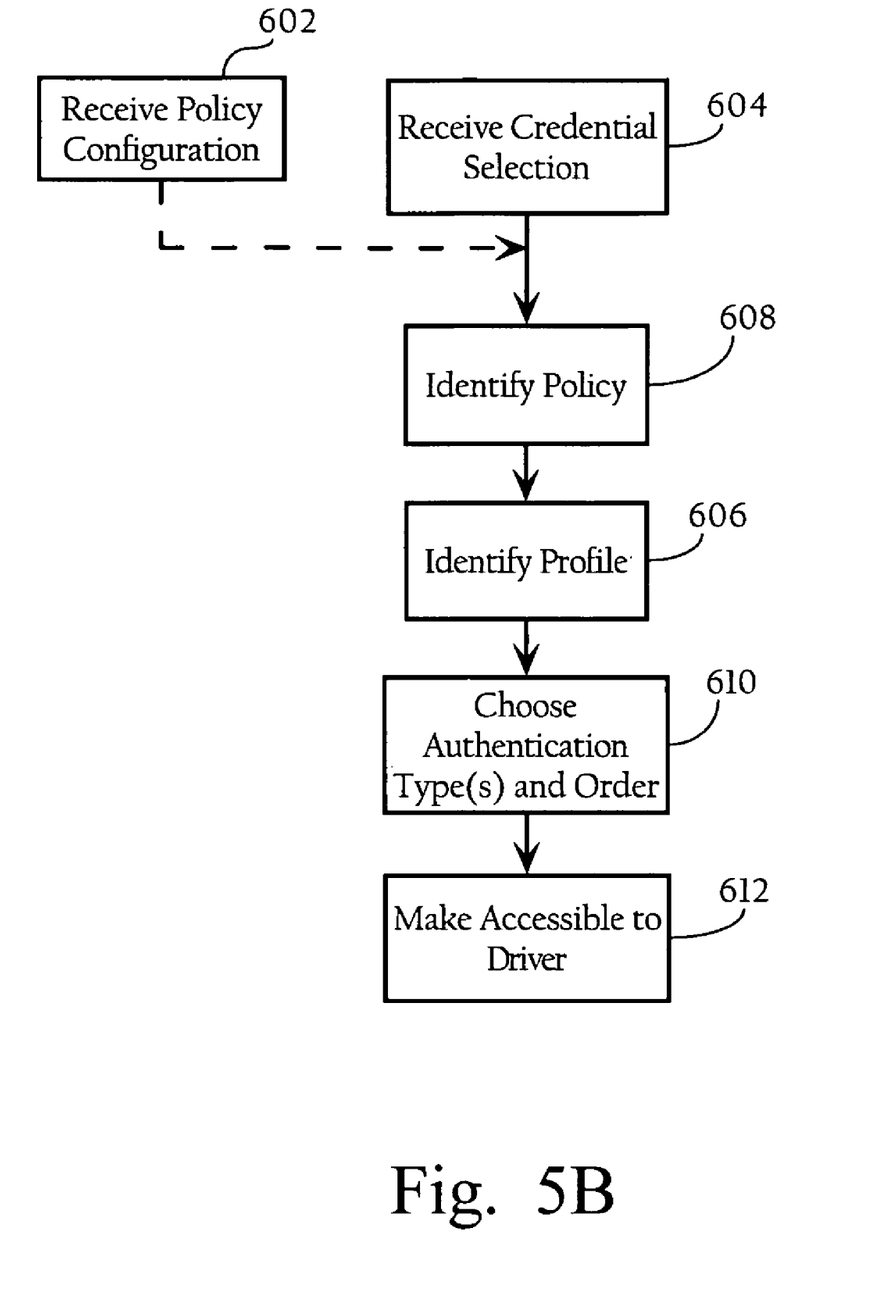
FIG. 5B is a flow chart illustrating a process flow, according to another implementation of the present invention, implemented by a client configuration application.
Figure 5C:
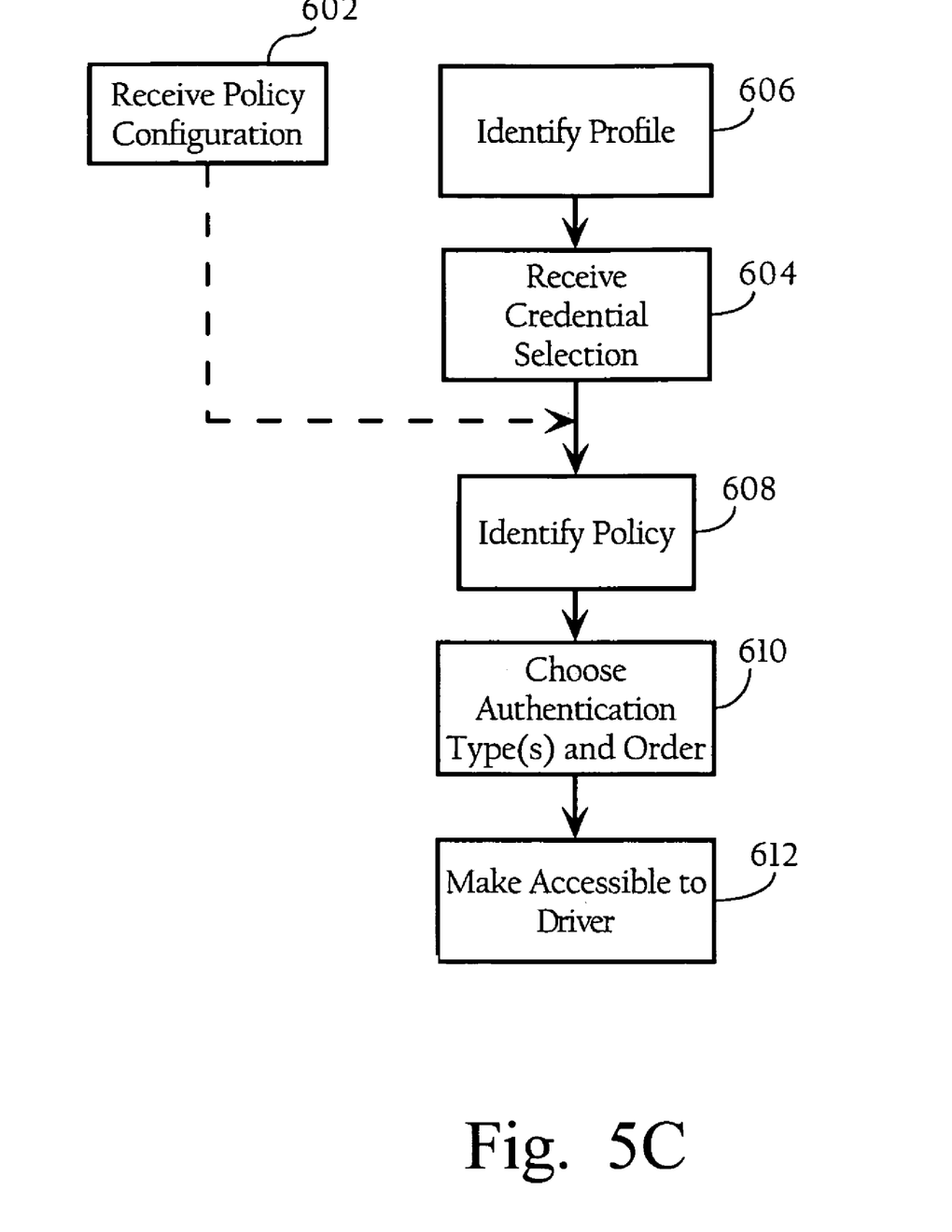
FIG. 5C is a flow chart illustrating a process flow, according to another implementation of the present invention, implemented by a client configuration application.

Note that the client configuration application may receive a credential selection, identify a profile, and identify a policy in any order. For example, while FIG. 5A above illustrates one implementation where the client configuration application first receives a credential selection, then identifies a profile first, and then identifies a policy, FIG. 5B below shows one implementation where the client configuration application first receives a credential selection, then identifies a policy, and then identifies a profile. FIG. 5C below shows one implementation where the client configuration application first identifies a profile, then receives a credential selection, and then identifies a policy. In FIGS. 5A-5C, or in any other permutation, each step may be based in the previous step(s).

FIG. 5B is a flow chart illustrating a process flow, according to another implementation of the present invention, implemented by a client configuration application. The process flow described in FIG. 5B is similar to the process flow described above in FIG. 5A except that the client configuration application first identifies a policy (608). In one implementation, the identification of the policy may be based on the credential selection and the policy configuration. The client configuration application then identifies a profile (606). In one implementation, the identification of the profile may be based on the credential selection and the identified policy.

FIG. 5C is a flow chart illustrating a process flow, according to another implementation of the present invention, implemented by a client configuration application. The process flow of FIG. 5C is similar to the process flow described above in FIG. 5A except that the client configuration application first identifies a profile (606). In one implementation, the identification of the policy may be a default profile based on the configuration. The client configuration application then receives a credential selection (604). The client configuration application then identifies a policy (608). In one implementation, the identification of the profile may be based on the identified policy and the credential selection.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. Logic for facilitating authentication, the logic encoded in one or more non-transitory tangible media for execution and when executed operable to cause a processor to:
receive, at a network client, a credential type selection from a user of the network client;
apply a policy configuration based on the credential type selection to select one or more Extensible Authentication Protocol (EAP) types from a plurality of EAP types, wherein the policy configuration comprises a mapping between credential types and EAP types;
order the one or more selected EAP types that map to the credential type selection, the ordering defined by the policy; and
make the one or more selected EAP types available to a network profile operated on by a network interface driver of the network client, wherein the network interface driver is operable to negotiate a secure network connection using the one or more selected EAP types.

2. The logic of claim 1 wherein the logic is further operable to:
support multiple EAP types.

3. The logic of claim 1 wherein the logic is further operable to:
authenticate to a remote node based on the one or more selected EAP types.

4. The logic of claim 1 wherein the logic is further operable to:
select a network profile; and
authenticate based at least in part on the network profile.

5. The logic of claim 1 wherein the network interface is a wireless network interface.

6. The logic of claim 1 wherein the network interface is a wired Ethernet network interface.

7. The logic of claim 1 wherein the policy configuration may be
preconfigured on a client or dynamically provisioned.

8. A method for facilitating authentication, the method comprising:
receiving, at a network client, a credential type selection from a user of the network client;
applying a policy configuration based on the credential type selection to select one or more EAP types from a plurality of EAP types, wherein the policy configuration comprises a mapping between credential types and EAP types;
ordering the one or more selected EAP types that map to the credential type selection, the ordering defined by the policy; and
making the one or more selected EAP types available to a network profile operated on by a network interface driver of the network client, wherein the network interface driver is operable to negotiate a secure network connection using the one or more selected EAP types.

9. The method of claim 8 further comprising:
supporting multiple EAP types.

10. The method of claim 8 further comprising:
authenticating to a remote node based on the one or more selected EAP types.

11. The method of claim 8 further comprising:
selecting a profile; and
authenticating based at least in part on the profile.

12. The method of claim 8 wherein the network interface is a wireless network interface.

13. The method of claim 8 wherein the network interface is a wired Ethernet network interface.

14. The method of claim 8 wherein the one or more policies may be preconfigured on a client or dynamically provisioned.

15. Logic for facilitating authentication, the logic encoded in one or more non-transitory tangible media for execution and when executed operable to cause a processor to:
receive, at a network client, a credential type selection from a user of the network client;
apply a policy configuration for mapping the credential type selection with one or more EAP types from a plurality of EAP types;
select and configure one or more EAP types in association with a given network profile based on the policy configuration, the credential type selection and one or more policies; and
make the one or more selected EAP types available to a network interface driver of the network client, wherein the network interface driver is operable to negotiate a secure network connection using the one or more selected EAP types.

16. The logic of claim 15 wherein the network application further comprises instructions operable to cause the one or more processors and the apparatus to:
support one or more authentication mechanisms.

17. A method for facilitating authentication, the method comprising:
receiving, at a network client, a credential type selection from a user of the network client;
applying a policy configuration for mapping the credential type selection with one or more EAP types from a plurality of EAP types;

selecting and configuring one or more EAP types in association with a given network profile based on the policy configuration, the credential type selection and one or more policies; and making the one or more selected EAP types available to a network interface driver of the network client.

18. The method of claim 17 further comprising:

supporting one or more authentication mechanisms.

19. An apparatus, comprising:

a network interface;

a processor;

a memory;

computer-executable program code stored in the memory and executable by the processor, the computer-executable program code comprising     a network interface driver module comprising computer-executable instructions configured, when executed, to cause the processor to control one or more connection and authentication operations of the network interface; and     a configuration utility module comprising computer-executable instructions configured, when executed to cause the processor to:

receive a credential type selection from a user of the network client,         apply a policy configuration based on the credential type selection to select one or more EAP types from a plurality of EAP types, wherein the policy configuration comprises a mapping between credential types and EAP types;

order the one or more selected EAP types that map to the credential type selection, the ordering defined by the policy; and         make the one or more selected EAP types available to a network profile operated on by a network interface driver of the network client, wherein the network interface driver is operable to negotiate a secure network connection using the one or more selected EAP types.

\* \* \* \* \*